(12) United States Patent
Choi

(10) Patent No.: US 7,663,676 B2
(45) Date of Patent: Feb. 16, 2010

(54) IMAGE COMPOSING APPARATUS AND METHOD OF PORTABLE TERMINAL

(75) Inventor: Kang-Sun Choi, Suwon-si (KR)

(73) Assignee: Samsung Electronics Co., Ltd. (KR)

(*) Notice: Subject to any disclaimer, the term of this patent is extended or adjusted under 35 U.S.C. 154(b) by 418 days.

(21) Appl. No.: 11/810,910

(22) Filed: Jun. 7, 2007

(65) Prior Publication Data

US 2008/0024628 A1  Jan. 31, 2008

(30) Foreign Application Priority Data

Jun. 7, 2006   (KR) ................. 10-2006-0050845

(51) Int. Cl.
*H04N 5/262* (2006.01)
*H04N 5/232* (2006.01)
*G06K 9/36* (2006.01)
*G06K 9/32* (2006.01)

(52) U.S. Cl. ............... 348/239; 348/347; 348/240.99; 382/284

(58) Field of Classification Search ........... 348/239, 348/231.3, 231.6, 347, 252, 352, 586, 584, 348/588, 589, 597, 211.9, 240.99, 240.1–240.3, 348/26; 382/284, 294, 295; 345/641, 634, 345/630–632; 455/575.1; 396/3
See application file for complete search history.

(56) References Cited

U.S. PATENT DOCUMENTS

| | | | | |
|---|---|---|---|---|
| 5,687,306 | A * | 11/1997 | Blank ........................ | 345/634 |
| 6,366,316 | B1 * | 4/2002 | Parulski et al. ............. | 348/239 |
| 6,621,524 | B1 * | 9/2003 | Iijima et al. ................ | 348/584 |
| 7,024,054 | B2 * | 4/2006 | Cahill et al. ............... | 382/294 |
| 7,321,393 | B2 * | 1/2008 | Kim ..................... | 348/333.03 |
| 2007/0019104 | A1 * | 1/2007 | Inoue et al. ................ | 348/345 |

* cited by examiner

*Primary Examiner*—Tuan Ho
*Assistant Examiner*—Marly Camargo
(74) *Attorney, Agent, or Firm*—The Farrell Law Firm, LLP

(57) ABSTRACT

An image composing apparatus and method of a portable terminal are provided. The image composing method includes photographing an object when a key for photographing using a background image is input; extracting contours of the background image and the photographed image; and combining the background image and the photographed image such that the extracted contours are matched with each other. The photographed image can be correctly matched with the background image through only one-time photographing, even when the shaking of the user's hand occurs or the object to be photographed moves.

14 Claims, 6 Drawing Sheets

IMAGE COMPOSING APPARATUS AND METHOD OF PORTABLE TERMINAL

PRIORITY

This application claims priority under 35 U.S.C. § 119 to an application filed in the Korean Intellectual Property Office on Jun. 7, 2006 and allocated Serial No. 2006-50845, the contents of which are hereby incorporated by reference.

BACKGROUND OF THE INVENTION

1. Field of the Invention

The present invention relates generally to an image composing apparatus and method of a portable terminal, and in particular, to an image composing apparatus and method for combining a background image and a photographed image using contour matching.

2. Description of the Related Art

As portable terminals become miniaturized, lightweight and slim, their use is increasing because of their convenient portability. Various additional functions are embedded in the portable terminals. For example, the portable terminals provide a game function, a scheduler function, a morning call function, an MPEG layer 3 (MP3) function, a moving picture player function, a digital camera function, and so on.

In particular, the digital camera function is considered as an essential component and thus is provided to most of the portable terminals. The digital camera function of the portable terminals provides a photographing function using a background image, as well as a simple photographing function. For example, the digital camera function provides a sticker photographing function, a special background photographing function, and so on. As illustrated in FIGS. 1A and 1B, the photographing function using the background image is used to obtain a combined image by overlapping a photographed image of FIG. 1A with a preset background image of FIG. 1B, e.g., a picture frame image or a sticker image.

In photographing an object using the background image, a user moves the portable terminal to adjust an angle and distance between the digital camera mounted on the portable terminal and an object to be photographed and their respective positions, and then photographs the object while adjusting the position and size of the object to a predetermined region of the background image, i.e., an empty region where no image exists.

However, the shaking of the user's hand may occur when the user photographs the object while moving the portable terminal. In addition, due to the movement of the object to be photograph, it is difficult to correctly adjust the position and size of the object to the empty region of the background image. For example, the photographed image of the object may be offset to the left or right in the empty region of the background image as illustrated in FIGS. 2A and 2B, or may be too close or too far to the background image as illustrated in FIGS. 2C and 2D. Therefore, when the photographed image of the object is not matched with the background image, the user must try to photograph the object several times in order to obtain the photograph correctly matched with the background image.

SUMMARY OF THE INVENTION

An aspect of the present invention is to substantially solve at least the above problems and/or disadvantages and to provide at least the advantages below. Accordingly, an object of the present invention is to provide an image composing apparatus and method of a portable terminal.

Another aspect of the present invention is to provide an image composing apparatus and method of a portable terminal, in which two images are combined using contours of a background image and a photographed image.

According to one aspect of the present invention, an image composing method of a portable terminal includes photographing an object when a key for photographing using a background image is input; extracting contours of the background image and the photographed image; and combining the background image and the photographed image such that the extracted contour of the background image is matched to the extracted contour of the photographed image.

According to another aspect of the present invention, an image composing apparatus of a portable terminal includes a contour matching unit for combining a background image and a photographed image such that contour of the background image and the contour of the photographed image are matched with each other; and a display unit for displaying the combined image.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention relates to an image composing apparatus and method for combining two images using the contour of a photographed image and the contour of a background image. The contour of the background image is a boundary line of an empty region where an object to be photographed will be displayed. The contour of the photographed image is a boundary line of the object to be displayed in the empty region of the background image.

Figure 1A:
FIGS. 1A and 1B illustrate a photographed image and a background image in a portable terminal, respectively.
Figure 1B:
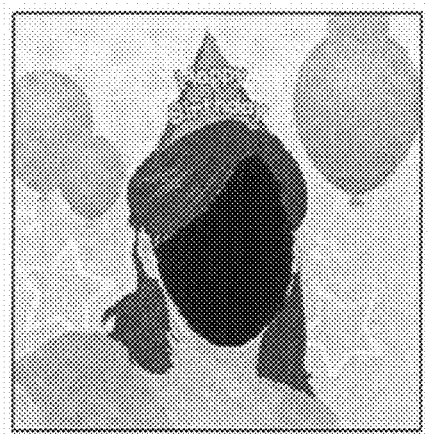
Figure 2A:
FIGS. 2A to 2D illustrate images photographed using a background image in a conventional portable terminal.
Figure 2B:
Figure 2C:
Figure 2D:
Figure 3:
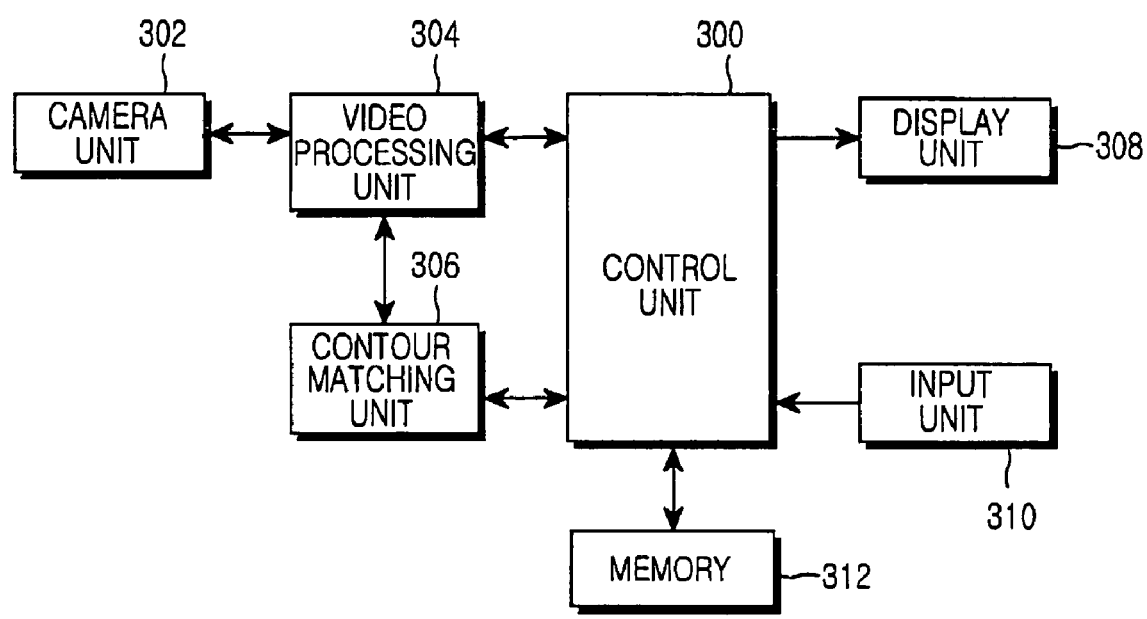
FIG. 3 is a block diagram of a portable terminal according to the present invention.

FIG. 3 is a block diagram of a portable terminal according to the present invention.

Referring to FIG. 3, the portable terminal includes a control unit 300, a camera unit 302, a video processing unit 304, a contour matching unit 306, a display unit 308, an input unit 310, and a storage unit 312.

The control unit 300 processes and controls a voice communication and a data communication. In addition, in photographing an object using a background image, the control unit 300 displays the photographed image, the background image, and a combined image on the display unit 308, and corrects the combined image.

The camera unit 302 includes a camera sensor and a signal processor. The camera sensor converts an optical signal detected during photographing into an electric signal, and the signal processor converts an analog video signal from the camera sensor into digital data. The camera sensor can be implemented with a charge coupled device (CCD) sensor and the signal processor can be implemented with a digital signal processor (DSP).

The video processing unit 304 processes the video signal output from the camera unit 302 on a frame basis and outputs the processed video signal according to the characteristic and size of the display unit 308. In addition, the video processing unit 304 includes a video codec to code the video signal in accordance with a preset scheme and decode a coded frame video signal into an original frame video signal.

The contour matching unit 306 receives the photographed image output from the video processor 304 and the background image read by the control unit 300 from the storage unit 312, and extracts the contours of the photographed image and the background image. The contour matching unit 306 obtains a combined image by adjusting the position and size of the photographed image such that their contours are maximally matched with each other, and outputs the obtained combined image to the control unit 300.

The display unit 308 displays status information generated during operations, numbers and characters, and so on. In addition, the display unit 308 displays the background image and the video data input from the control unit 300 during the photographing mode and displays the combined image when the photographing mode using the background image is selected.

The input unit 310 includes a plurality of function keys and provides key input data to the control unit 300. Specifically, the input unit 310 receives an input of up/down/right/left navigation keys, a zoom-in key or a zoom-out key and provides the key input to the control unit 300.

The storage unit 312 includes a program memory, a data memory, and a nonvolatile memory. The program memory stores a program for controlling the overall operation of the portable terminal. The program memory also stores a program for extracting the contours of the photographed image and the background image, combining the two images, and correcting the combined image. The program memory can be implemented with a flash memory. The data memory temporarily stores data generated during operations. The data memory can be implemented with a random access memory (RAM). The nonvolatile memory stores system parameters and backup data, e.g., phone numbers, photographs, background images, etc. In addition, the nonvolatile memory stores a predetermined number of preset magnifications for adjusting the size of the photographed image. The preset magnifications are used to enlarge or reduce the size of the photographed image in order to maximally match the contour of the photographed image with the contour of the background image.

Figure 4:
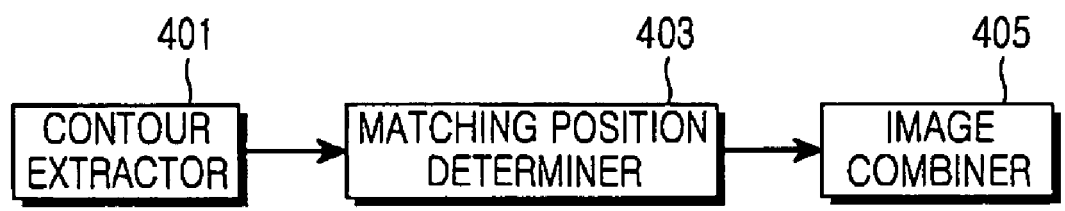
FIG. 4 is a block diagram of a contour matching unit in a portable terminal according to the present invention.

FIG. 4 is a block diagram of the contour matching unit illustrated in FIG. 3.

Referring to FIG. 4, the contour matching unit 306 includes a contour extractor 401, a matching position determiner 403, and an image combiner 405.

The contour extractor 401 receives the photographed image output from the image processing unit 304 and the background image read by the control unit 300 from the storage unit 312, and extracts the contour of the object from the photographed image using a contour extraction algorithm. The contour extractor provides the matching position determiner 403 with gradient values representing the extracted contours of the two images. The contour extraction algorithm may, use for example, a Sobel operator, a Prewitt operator, a Robert operator, or a Laplacian operator. In addition, in determining the matching positions of the two images, the influence of noise can be reduced by applying a low pass filter (LPF) such as a Gaussian filter before the contour extraction.

The matching position determiner 403 determines the position and magnification at which the contours of the two images are maximally matched with each other, and provides the determined position and magnification to the image combiner 405. The matching position determiner 403 obtains the magnitudes of the gradient values in the two images by taking absolute values of the gradient values representing the contours of the two images. The matching position determiner 403 obtains the position and magnification at which the contours of the two images are maximally matched with each other, while adjusting the position and size of the photographed image. The step of obtaining the position and magnification at which the contours of the two images are maximally matched with each other includes multiplying gradients of pixels corresponding to the two images, while enlarging/reducing the photographed image according to the preset magnifications or moving it up/down/right/left; and obtaining the position and size at which the sum of the multiplied values is maximum. Although the matching position of the two contours is obtained by maximizing the sum of the values obtained by multiplying the gradients of the two images, it can also be obtained by extracting salient points from the contours of the two images and matching the extracted salient points.

The image combiner 405 moves and/or enlarges/reduces the photographed image according to the position and magnification input from the matching position determiner 403 and combines the photographed image and the background image, and then provides the combined image to the control unit 300.

Figure 5:
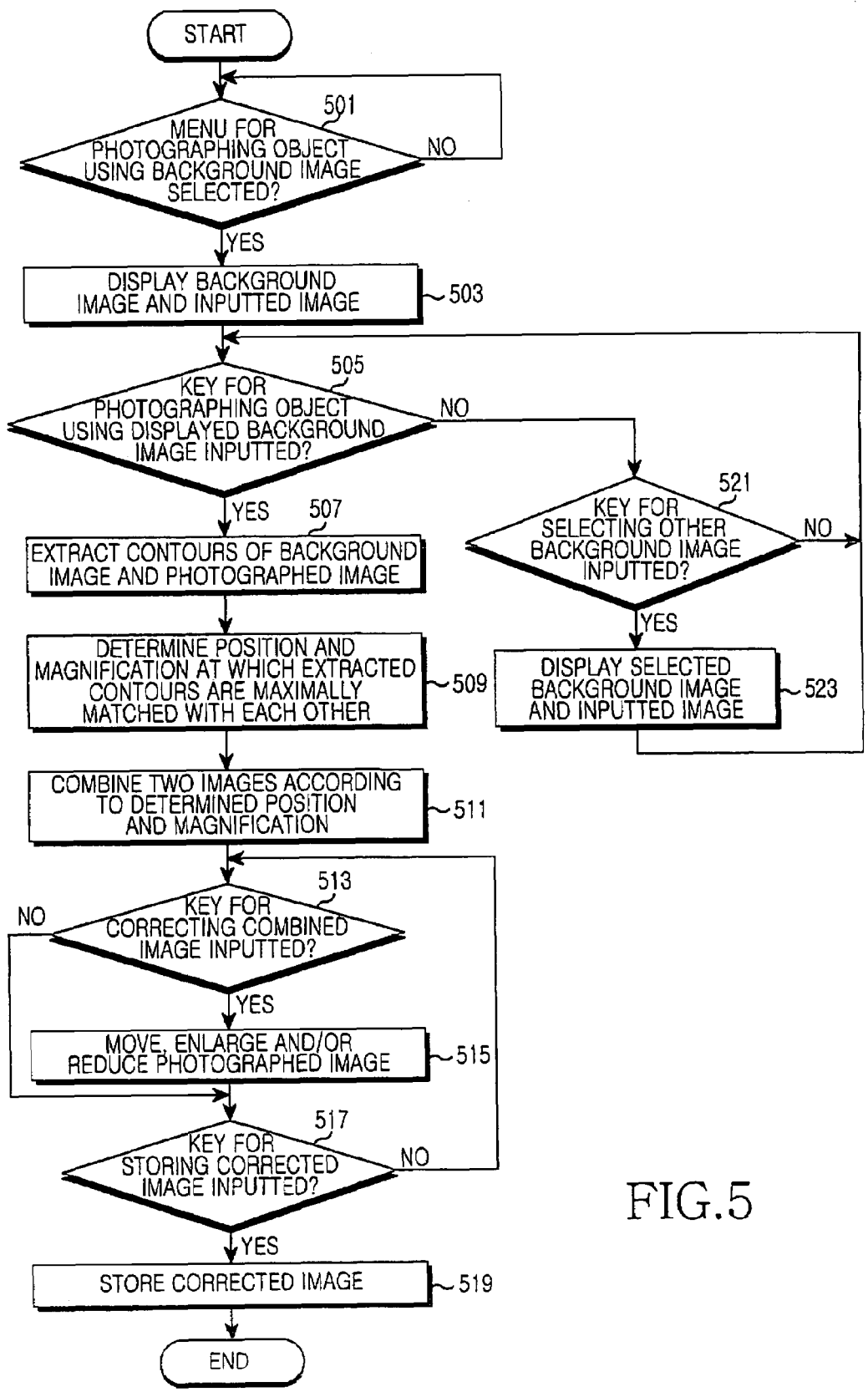
FIG. 5 is a flowchart illustrating an image composing method using a contour in a portable terminal according to the present invention.

FIG. 5 is a flowchart illustrating an image composing method using the contour in a portable terminal according to the present invention.

Referring to FIG. 5, the portable terminal detects if a menu for photographing an object using a background image, e.g., a sticker image or picture frame image, is selected in step 501. When the corresponding menu is selected in step 501, the portable terminal displays the background image and a video signal input from a camera on the display unit 308 in step 503. The background image may be a default background image or a previously selected background image.

In step 505, the portable terminal detects if a key for photographing an object using the displayed background image is input. When the corresponding key is not input, the portable terminal detects if a key for selecting other background image is input in step 521. When the key for selecting other background image is input, the portable terminal continues to display the selected background image and the video signal input from the camera in step 523. Then, the process returns to step 505. On the other hand, when the key for selecting other background image is not input in step 521, the process returns to step 505.

When the key for photographing the object is input in step 505, the portable terminal performs step 507 to photograph the object, extract the contour of the object from the photographed image, and extract the contour of an empty region, where no object is displayed, from the selected background image. In step 509, the portable terminal determines a position and magnification at which the contours of the two images are maximally matched with each other. In other words, the magnitudes of the gradient values in the two images are obtained by taking the absolute values of the gradient values representing the contours of the two images, and the gradient values of the pixels corresponding to the two images are multiplied while adjusting the position and magnification of the photographed image. Then, the position and magnification at which the sum of the multiplied values is maximum are obtained. In step 511, the portable terminal combines the photographed image and the background image according to the determined position and magnification and displays the combined image on the display unit 308.

In step 513, the portable terminal detects if a key for correcting the combined image is input. The key for correcting the combined image may include up/down/right/left navigation keys, a zoom-in key, and a zoom-out key. When the key for correcting the combined image is input, the process proceeds to step 515. In step 515, the portable terminal corrects the combined image by moving the photographed image of the combined image up/down/right/left or enlarging/reducing the size of the photographed image while adjusting the magnification, depending on the input key. On the other hand, when the key for correcting the combined image is not input, the process proceeds to step 517.

In step 517, the portable terminal detects if a key for storing the corrected image is input. When the key for storing the corrected image is not input, the process returns to step 513. When the key for storing the corrected image is input, the portable terminal stores the corrected image in step 519. Then, the portable terminal terminates the algorithm.

As described above, the two images are combined by extracting the contours of the background image and the photographed image. Alternatively, after the contour of the background image is previously extracted and stored in the storage unit, it is read from the storage unit and then used when the image photographing is selected.

Figure 6:
FIG. 6 illustrates an image combined using a contour in a portable terminal according to the present invention.

By combining the two images using the contours of the photographed image and the background image, the photographed image can be correctly matched with the background image through only one-time photographing as shown in FIG. 6, even when the shaking of the user's hand occurs or the object to be photographed moves.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An image composing method of a portable terminal, comprising the steps of:
    photographing an object to produce a photographed image when a key for photographing using a background image is input;
    extracting contours of the background image and the photographed image; and
    combining the background image and the photographed image such that the extracted contour of the background image is matched with the extended contour of the photographed image,
    wherein combining the background image and the photographed image comprises:
    calculating gradients of the contours of the photographed image and the background image at each pixel;
    calculating a sum of values obtained by multiplying the gradients of the pixels of the background image and the photographed image, while moving, enlarging and/or reducing the photographed image;
    determining a position and a magnification or the photographed image when the calculated sum is maximized;
    correcting the photographed image according to the determined position and magnification; and
    combining the background image and the corrected image.

2. The image composing method of claim 1, further comprising correcting the combined image when a key for correcting the combined image is input.

3. The image composing method of claim 2, wherein the key for correcting the combined image includes up/down/right/left navigation keys, a zoom-in key, and/or a zoom-out key.

4. The image composing method of claim 1, wherein determining the position and magnification of the photographed image comprises:
    extracting salient points from the contours of the background image and the photographed image; and
    determining the position and magnification of the photographed image when the extracted salient points are matched, while moving, enlarging and/or reducing the photographed image.

5. The image composing method of claim 1, wherein the contour of the background image is previously extracted and stored in a storage unit before the photographing and is read from the storage unit during the photographing.

6. An image composing apparatus of a portable terminal, comprising:
    a contour matching unit for combining a background image and a photographed image such that contours of the background image and contours of the photographed image are matched with each other; and
    a display unit for displaying the combined image,
    wherein the contour matching unit combines the background image and the photographed by calculating gradients of the contours of the photographed image and the background image at each pixel, calculates a sum of values obtained by multiplying the gradients of the pixels of the background image and the photographed image, while moving, enlarging and/or reducing the photographed image, determines a position and a magnification of the photographed image when the calculated sum is maximized, corrects the photographed image according to the determined position and magnification, and combines the background image and the corrected image.

7. The image composing apparatus of claim 6, further comprising a control wilt for moving, enlarging and/or reducing the photographed image within the combined image when a key for correcting the combined image is input.

8. The image composing apparatus of claim 6, wherein the contour matching unit comprises:
    a contour extractor for extracting the contours of the background image and the photographed image;
    a matching point determiner for moving, enlarging and/or reducing the contour of the photographed image to determine the position and the magnification; and
    an image combiner for correcting the photographed image according to the determined position and magnification and combining the connected photographed image with the background image.

9. An image composing method of a portable terminal, comprising:
    combining a background image and a photographed image such that contours of the background image and contours of the photographed image are matched with each other; and
    displaying the combined image,
    wherein combining the background image and the photographed image comprises:
    calculating gradients of the contours of the photographed image and the background image at each pixel;
    calculating a sum of values obtained by multiplying the gradients of the pixels of the background image and the photographed image, while moving, enlarging and/or reducing the photographed image;

determining a position and a magnification of the photographed image when the calculated sum is maximized;

correcting the photographed image according to the determined position and magnification; and combining the background image and the corrected image.

10. The image composing method of claim 9, further comprising moving, enlarging and/or reducing the photographed image within the combined image when a key for correcting the combined image is input.

11. An image composing apparatus of a portable terminal, comprising:

means for photographing an object to produce a photographed image when a key for photographing using a background image is input;

means for extracting contours of the background image and the photographed image; and means for combining the background image and the photographed image such that the extracted contour of the background image is matched with the extended contour of the photographed image, wherein the means for combining the background image combines the background image and the photographed by calculating gradients of the contours of the photographed image and the background image at each pixel, calculates a sum of values obtained by multiplying the gradients of the pixels of the background image and the photographed image, while moving, enlarging and/or reducing the photographed image, determines a position and a magnification of the photographed image when the calculated sum is maximized, corrects the photographed image according to the determined position and magnification, and combines the background image and the corrected image.

12. The image composing apparatus of claim 11, further comprising means for correcting the combined image when a key for correcting the combined image is input.

13. The image composing apparatus of claim 12, wherein the key for correcting the combined image includes up/down/right/left navigation keys, a zoom-in key, and/or a zoom-out key.

14. The image composing apparatus of claim 11, wherein the means for combining the background image and the photographed image comprises:

means for determining the position and the magnification of the photographed image when the extracted contours are matched with each other;

means for correcting the photographed image according to the determined position and magnification; and means for combining the background image and the corrected image.

* * * * *